(12) United States Patent
Tanghetti

(10) Patent No.: US 9,915,384 B2
(45) Date of Patent: Mar. 13, 2018

(54) FITTING FOR PIPES AND RELEVANT PIPE CONNECTING METHOD

(71) Applicant: EFFEBI S.p.A., Bovezzo (BS) (IT)

(72) Inventor: Ermanno Tanghetti, Bovezzo (BS) (IT)

(73) Assignee: EFFEBI S.P.A., Bovezzo (BS) (IT)

( * ) Notice: Subject to any disclaimer, the term of this patent is extended or adjusted under 35 U.S.C. 154(b) by 0 days.

(21) Appl. No.: 15/448,723

(22) Filed: Mar. 3, 2017

(65) Prior Publication Data

US 2017/0175936 A1   Jun. 22, 2017

Related U.S. Application Data

(62) Division of application No. 14/008,128, filed as application No. PCT/IB2012/000597 on Mar. 26, 2012, now Pat. No. 9,618,146.

(30) Foreign Application Priority Data

Apr. 11, 2011   (IT) .............................. MI2011A0603

(51) Int. Cl.
*F16L 19/02*         (2006.01)
*F16L 19/12*         (2006.01)
(Continued)

(52) U.S. Cl.
CPC ............... *F16L 19/12* (2013.01); *B23P 19/04* (2013.01); *F16L 19/086* (2013.01); *Y10T 29/49948* (2015.01)

(58) Field of Classification Search
CPC ..... F16L 19/12; F16L 19/086; F16L 19/0212; F16L 19/0218; F16L 19/10; F16L 19/043;
(Continued)

(56) References Cited

U.S. PATENT DOCUMENTS 3,140,107 A * 7/1964 Hynes ................... F16L 19/086
                                                                285/340
3,291,510 A * 12/1966 Kody .................... F16L 19/086
                                                                285/340
(Continued)

FOREIGN PATENT DOCUMENTS

CA            579377 A      7/1959
DE          4327236 A1      2/1995
(Continued)

OTHER PUBLICATIONS

International Search Report and Written Opinion of PCT/IB2012/000597 dated Jan. 31, 2012. (11 Pages).

Primary Examiner — Jun Yoo
(74) Attorney, Agent, or Firm — Lucas & Mercanti, LLP

(57) ABSTRACT

A fitting for a pipe is disclosed. It includes a main body for internally accommodating the pipe, fastening means able to be tightened to the main body, a deformable annular sealing gasket and a blocking ring nut which can be positioned within the fitting between the main body and the fastening means, respectively, to ensure the sealing of, and block in firm position, the pipe, at least when the fastening means are tightened to the main body, the blocking ring nut being elastically deformable in radial direction. The fitting also has means for retaining in a widened position at least the mouth section of the annular sealing gasket, with an inner diameter greater than the outer diameter of the pipe.

15 Claims, 6 Drawing Sheets

(51) Int. Cl.
*F16L 19/08* (2006.01)
*B23P 19/04* (2006.01)

(58) Field of Classification Search
CPC ....... F16L 19/045; F16L 19/046; B23P 19/04; Y10T 29/49948
See application file for complete search history.

(56) References Cited

U.S. PATENT DOCUMENTS

| | | | |
|---|---|---|---|
| 3,695,640 A * | 10/1972 | Clague | F16L 19/12 |
| | | | 285/116 |
| 3,848,905 A | 11/1974 | Hammer et al. | |
| 4,082,326 A | 4/1978 | Bryson | |
| 5,351,998 A * | 10/1994 | Behrens | F16L 19/12 |
| | | | 285/341 |
| 5,496,076 A * | 3/1996 | Lin | F16L 19/086 |
| | | | 285/110 |

FOREIGN PATENT DOCUMENTS

| | | | |
|---|---|---|---|
| FR | 1382489 A | 12/1964 | |
| WO | 02057678 A1 | 7/2002 | |

\* cited by examiner

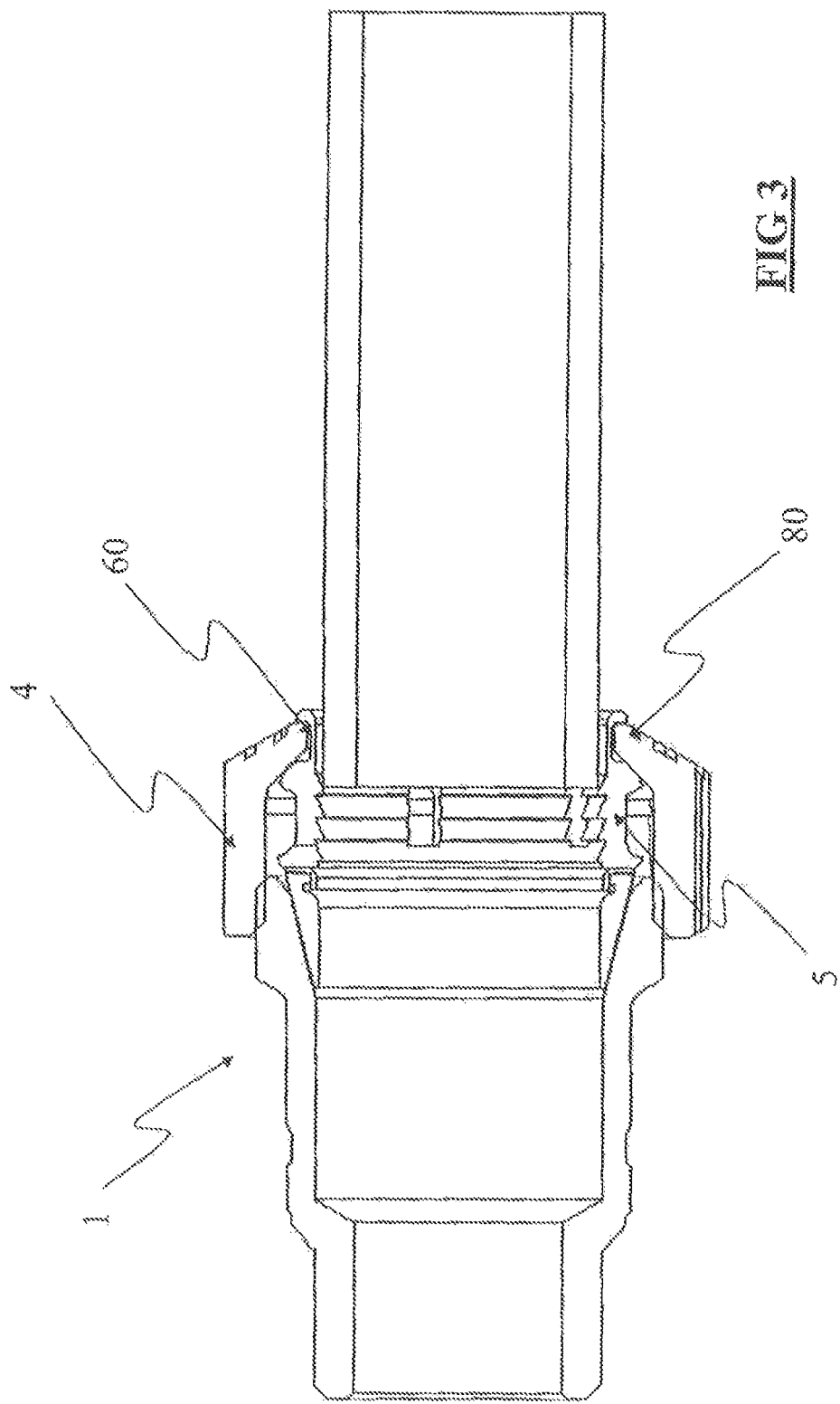

FITTING FOR PIPES AND RELEVANT PIPE CONNECTING METHOD

CROSS-REFERENCE TO RELATED APPLICATIONS

This application is a divisional of U.S. patent application Ser. No. 14/008,128, filed Oct. 23, 2013, which in turn is a 371 of PCT/IB2012/000597, filed Mar. 26, 2012, which claims the benefit of Italian Patent Application No. MI2011A000603, filed Apr. 11, 2011 the contents of each of which are incorporated herein by reference.

FIELD OF THE INVENTION

The present invention refers to a fitting for pipes and to a method for relevant connection between at least one pipe and the above said fitting.

BACKGROUND OF THE INVENTION

Fittings for pipes are known, made of plastic or metal, comprising a main body, also being made of plastic or metal, which internally accommodates an outer pipe, in order to connect it to a fluidic circuit placed upstream or downstream of the fitting, and fastening means, also made of metal or plastic, able to be tightened to the main body.

Generally, these fastening means comprise a nut that can be screwed on a corresponding threaded region of the main body or, alternatively, a nut, or bush, constrained to the main body by tie rods, consisting of screws or connecting bolts, for example.

Further, the main body accommodates an annular sealing gasket, of truncated cone, cylindrical or toroidal shape, preferably made of rubber or deformable synthetic material, and a notched, or anyhow deformable, blocking ring nut (also termed "ogive"), also being truncated cone, cylindrical or toroidal, able to ensure, once the nut is tightened to the main body, both the sealing, and the blocking of the pipe to the fitting in stable position, respectively.

According to the prior art there exist fittings of the above mentioned type, wherein advantageously the annular sealing gasket and the blocking ring nut are realized in a single piece.

In all of the above fittings, the outer pipe blockage within the fitting body and the fluidic sealing of the fitting itself are usually ensured by the interference coupling of conical walls, usually those of the inner surface of the fitting body and/or the relevant fastening nut with the outer walls of the blocking ring nut and/or in case of the annular gasket, such that the tightening of the nut to the main body of the fitting determines the progressive engagement of the blocking ring nut, and possibly the gasket, with the inner walls of the fitting, which walls, due to different taper, cause the substantially radial crushing of such a blocking ring nut (ogive), and possibly the annular gasket, on the outer pipe placed within the fitting itself.

This type of fitting, although rather efficient, has the drawback of not being easily connectable to the outer pipe, not allowing in fact the insertion of the pipe within the fitting, when the nut is combined, or even only partially screwed to the main body. In substance, before introducing the pipe within the main body of the fitting the fastening nut, the blocking ring nut (ogive) and the annular sealing gasket must be fitted (suited) onto the pipe and then, subsequently, when the pipe is completely introduced within the main body of the fitting, progress to first combining, and then tightening, the nut to the same main body.

This is mainly due to the fact that the annular sealing gasket, truncated cone or of other shape, if fitted within the main body before the pipe insertion, would be subjected, during the pipe insertion to a hardly amendable deformation, with subsequent sensitive reduction of the sealing efficiency of the fitting. The shape of the blocking ogives, with inner diameter substantially like outer diameter of the pipe and usually not elastically deformable, especially in radial direction, also helps avoiding that the pipe can be put into the fitting, or possibly withdrawn, after this last one has been almost totally pre-assembled.

This problem is due to the strong friction and/or interference generated between the inner surface of the annular sealing gasket, made of rubber or synthetic material, and the outer surface of the pipe, made of metal or plastic, during the insertion of the pipe within the fitting, and also to the presence of a blocking ogive which, during the pipe insertion, urges the annular sealing gasket to deform or results of hard suitability or yet axially moves, hampering the possible pipe insertion.

Therefore these drawbacks are responsible of a highly complicated, slow and not always effective connection between pipe and fitting.

U.S. Pat. No. 3,140,107, for example, illustrates such a fitting that, even provided with an abutment ring interposed between the sealing gasket and blocking ogive, provides, mainly due to the shape and properties of said blocking ogive, adopting the ring form with truncated cone development, that the pipe is preventively fitted into the tightening nut, and thus into said ogive and sealing gasket, with relevant abutment ring, before assembling the entire fitting.

The object of the present invention is, therefore, achieving a fitting able to make faster and, anyhow, reliable, the connection between the fitting itself and an outer pipe, avoiding the above mentioned technical drawbacks.

Further object of the present invention is achieving a connection method between outer pipe and fitting which is simple, fast and effective.

SUMMARY OF THE INVENTION

These and other objects are achieved by the present fitting for at least one pipe, comprising a main body for internally accommodating such a pipe, fastening means which can be tightened to the main body, and wherein the main body internally accommodates at least a generally deformable annular sealing gasket, provided with at least an mouth section for the pipe, and at least a blocking ring nut (ogive) for firmly and sealingly locking such pipe within the fitting, at least when said fastening means are tightened to the main body, and wherein such blocking ring nut is elastically deformable at least in radial direction. The fitting of the present invention also comprises, advantageously, means for retaining in a widened condition at least the mouth section of the afore said annular sealing gasket with inner diameter larger than the outer diameter of the external pipe.

Thus, due to the characteristic shape and properties of the blocking ring nut and to the presence of these retaining means, the annular sealing gasket, preferably truncated cone and made of rubber or other deformable material, at least at its mouth portion, does not modify its shape during the insertion of the pipe within the main body, thereby making the insertion of the pipe itself within the fitting and its possible withdrawal easy.

Next, once the pipe, made of a material selected from plastic, metal or plastic-metal composite, is inserted within the fitting, the same annular sealing gasket and the same blocking ring nut, due for example to the above mentioned interference of conical surfaces, are suitably compressed between the fastening means and the inside of the main body, such as to be able to respectively perform to ensure the seal of the pipe and retaining the pipe blocked within the fitting once these fastening means, preferably consisting of a nut, are tightened to the main body of the fitting.

According to a preferred embodiment of the present invention, the afore said retaining means for example comprise stiffening means of the mouth section of the annular sealing gasket and preferably comprising, for example, at least an annular stiff element having an inner diameter larger than the outer diameter of the pipe. This way, the pipe, at least at the mouth portion of the annular sealing gasket, does not substantially comes into contact with a mild rubbing, or interference, that, anyway, is such that it does not cause any deformation of the annular sealing gasket itself during the insertion of the pipe within the fitting.

The annular stiff element, made of a material selected from plastic and metal, can be removably combined within the seal gasket.

Such annular stiff element, for example, can be interference constrained to the seal gasket, realizing the annular stiff element with its own outer diameter slightly larger than the inner diameter of the mouth section of the sealing gasket, so as to interfere with the latter, causing its widening at such mouth section. The sealing gasket elasticity, then, causes the annular stiff element to be constrained to such a gasket.

Alternatively, the annular stiff element can also be not removably, and thus irremovably, constrained to the sealing gasket. Such annular stiff element, for example, once placed in interference with the sealing gasket, is glued and/or welded to the same gasket, or it can be molded atop by the material forming the gasket.

According to a second embodiment of the invention, the annular stiff element comprises at least an upper edge radially jutting with respect to its outer surface, to space the sealing gasket and the blocking ring nut between each other. Such annular stiff element takes a L-shaped profile.

The spacing edge of the annular stiff element, during the tightening of the fastening means (a nut for example), lays between the sealing gasket and the blocking ring nut ensuring that, for extremely high tightening momenta, the sealing gasket holds its shape and functionality within the fitting.

Further, the presence of the jutting edge of the annular stiff element plays the important role of avoiding that the blocking ring nut pinches, or damages, the gasket during the tightening of the nut, thus causing a reduced efficiency of the gasket itself. At last, according to a further embodiment of invention, the blocking ring nut is provided with an ending portion adapted to engage with the fastening means, consisting for example in an appropriate nut. Specifically such a portion of the blocking ring nut end is concave such that it can accommodate an ending portion of the same fastening means.

The objects of the invention are also achieved by virtue of a method for connecting a pipe to a fitting according to one or more of the claims from 2 to 14, characterized by the fact of comprising the steps of: a) positioning said at least one annular sealing gasket and said at least one blocking ring nut between the main body and fastening means; b) combining the fastening means (preferably made of an appropriate nut) to the main body; c) inserting said at least one pipe within the fitting; d) tightening the fastening means to the main body. The method of the present invention is characterized by the fact that the afore said step a) is anticipated by the step of retaining in widened position, by the afore said retaining means, with inner diameter larger than outer diameter of the pipe, at least the mouth section of the annular sealing gasket.

Such solution allows, therefore, inserting/withdrawing the pipe within the fitting even when the nut is combined, or even only partly screwed, to the main body, since the pipe does not deform the sealing gasket during the insertion into the fitting. The gasket remains stiff, at least in its mouth section, due to the presence of said retaining means placed at the mouth section of the sealing gasket itself.

BRIEF DESCRIPTION OF THE DRAWINGS

A number of particular embodiments of the present invention will be now described, by way of example only and not of limitation, referring to the attached figures, wherein:

FIG. 1b is a sectional view of a fitting according to the first embodiment of the invention represented in FIG. 1a;

FIG. 2b is a sectional view of a fitting according to the second embodiment represented in FIG. 2a;

FIG. 3 is a sectional view of a fitting according to a third embodiment of the invention;

DETAILED DESCRIPTION OF THE INVENTION

Figure 1A:
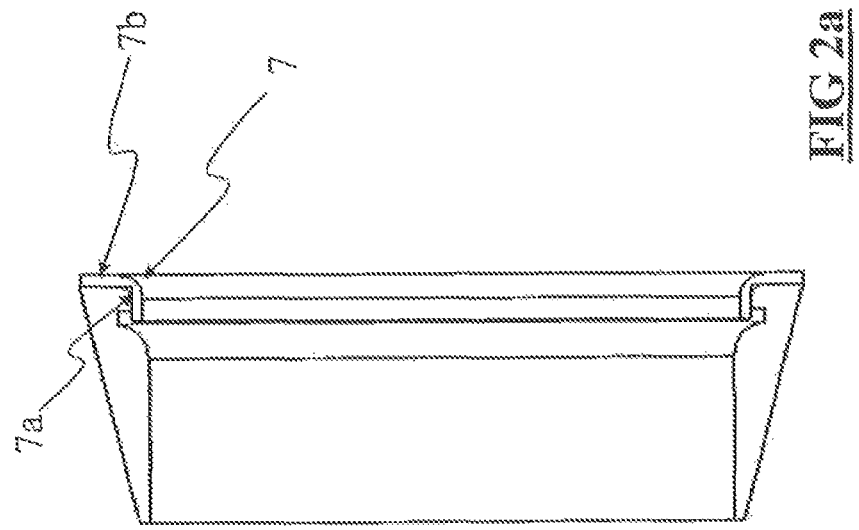
FIG. 1a is a sectional view of an annular sealing gasket and a corresponding annular stiff element according to a first embodiment of the invention.
Figure 1B:
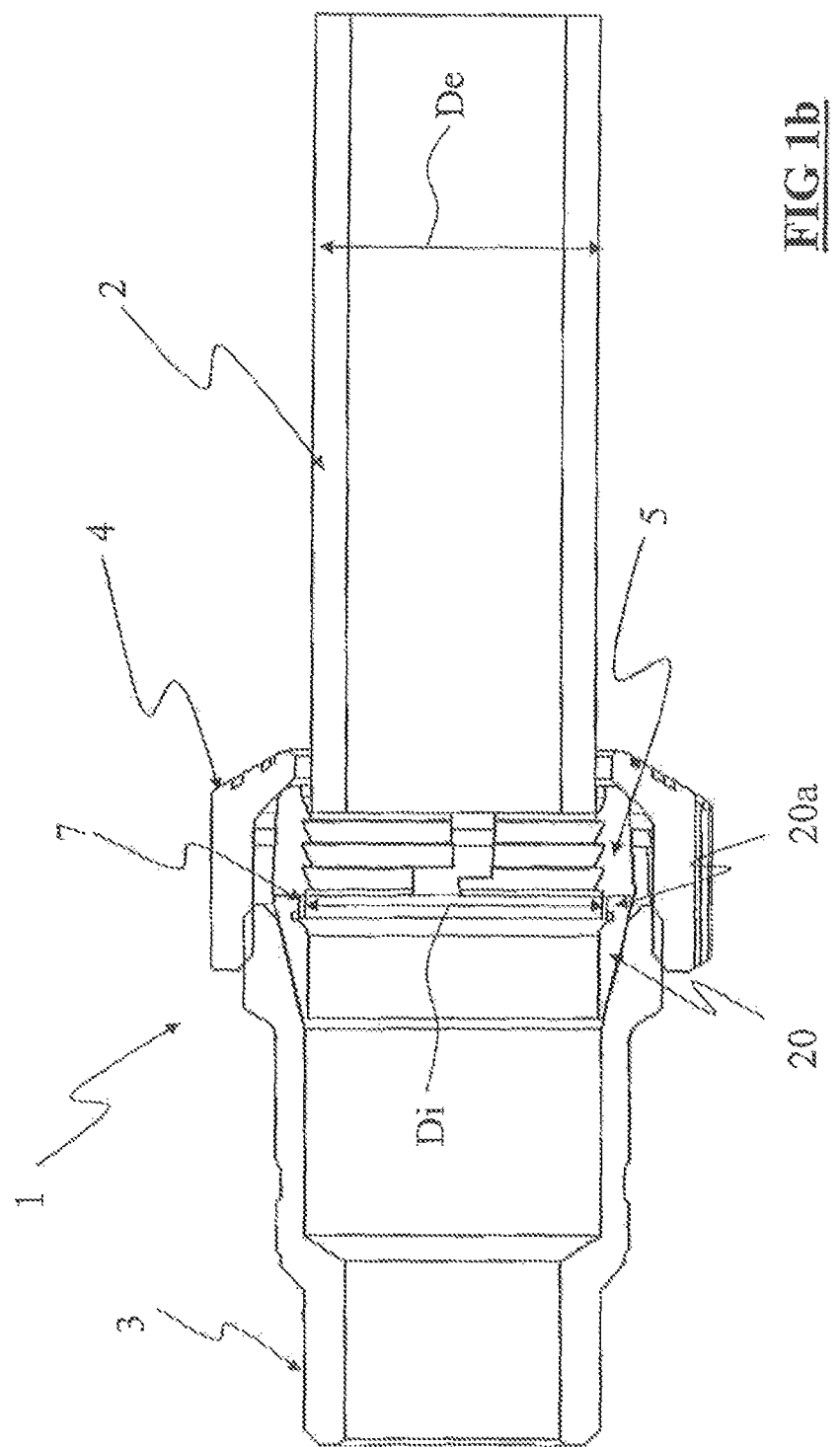

Referring particularly to these figures a fitting according to the invention has been indicated by the numeral 1. In FIGS. 1a and 1b a fitting 1 according to a first embodiment of the invention is represented.

Such fitting 1 for a pipe 2, preferably made of polyethylene, comprises a main body 3, with substantially cylindrical geometry and made of metal, able to internally accommodate the pipe 2, and fastening means 4 that can be tightened to the main body 3. These fastening means 4, in particular, comprise a nut, also made of metal that can be screwed to an appropriate threaded end 3a of the main body 3.

It has to be observed that these fastening means 4 and the main body 3 can also be made of plastic, or other material, without thereby departing from the scope of protection of the present invention, as well as can alternatively be made of a nut (or bush) constrained to the main body 3 by appropriate tie rods.

It has to be observed also that, whereas the embodiment of the fitting 1 herein described is employed on plastic pipes, nevertheless fittings for the employment with pipes made of metal material, or plastic-metal composite material, still fall in the protection scope of the present invention, as well as fittings for general flexible and/or deformable pipes.

The fitting 1 further comprises an annular sealing gasket 20, preferably of truncated cone shape and made of rubber, or other (synthetic or natural) deformable material, and a blocking ring nut 5, substantially cylindrical in shape and made of plastic or metal. Such a blocking ring nut 5 is also termed "ogive" in the field.

Both the annular gasket 20, and the blocking ring nut 5 are shaped and placed within the main body 3 and the relevant nut 4, such that the pipe 2 can pass through them, or put into them, when it is inserted within the fitting 1.

In this regard, both the sealing gasket 20 and the blocking ring nut 5, are internally accommodated in the main body 3 of the fitting 1 at inner regions of the latter that allow, when the nut 4 is tightened on the main body 3, the firmly and sealingly coupling of such gasket 20 and blocking ring nut 5 on the pipe 2. Then, the gasket 20, and the ring nut 5, both substantially annular, have thus a mouth section and an outlet section for the pipe 2.

Figure 5:
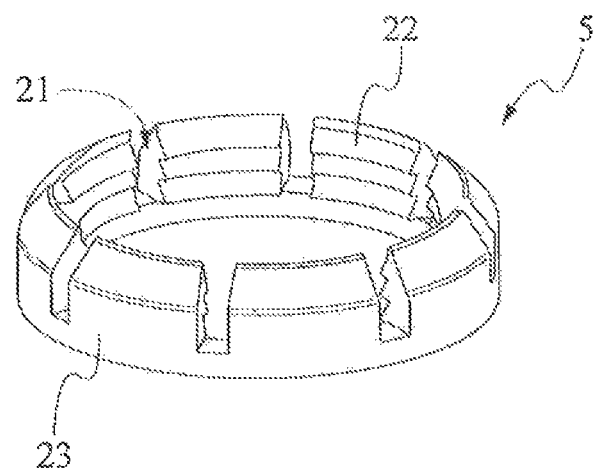
FIG. 5 is a perspective view of a blocking ring nut (ogive), according to a preferred aspect of the present invention.

In more detail, in the embodiment of the fitting 1 here shown and specifically referring to FIG. 5, the blocking ring nut 5 is made by a substantially cylindrical and/or truncated cone body, preferably made of plastic or metallic material, which is provided with at least an axial notch 21, not necessarily extended along the whole side surface of the ring nut 5, that allows it, sometimes also in combination with the elasticity of the material composing such ring nut 5, to be at least radially, and sometimes axially also, deformed (closed or open), and having some circular sealing ribs 22 on its inner surface. Such a blocking ring nut 5 is also designated to being accommodated, at least partially, within a region of the nut 4, having an inner truncated cone surface, having smaller diameter than that of the ring nut 5, when the latter has its own notch open, in case upon its coupling with a pipe 2.

In other words, the blocking ring nut 5, or ogive can have a notch extended along the whole extension of its side surface, and thus have a "C" shaped cross section, susceptible to radial deformation by notch closing/opening, or have, as in the here shown embodiment, one or more notches 21 that, extended from one end to an annular portion 23 forming the other end of the ogive 5, define two or more axially extended teeth, that can be radially moved closer/farther to each other for allowing the blocking of the pipe.

It has to be observed that such particular arrangement of the ogive 5 gives substantial elasticity to the ogive itself, even when the material forming the ogive 5 itself does not have excellent elastic properties, allowing it to elastically deform at least in radial direction.

As already described, in alternative embodiments not shown here, the ring nut 5 can be free from radial notches and anyway have shape and physical properties that allow it of being elastically deformed at least in radial direction so that the pipe 2 fitted within it can be blocked, when tightening the nut 4 on the body 3 of the fitting 1, and as to allow to easily withdraw the pipe 2 itself, when the nut 4 is partially untightened from the body 3.

Also observe that the blocking ring nut 5 can be made with such sizes and shape that, in unstressed condition, it shows an inner diameter larger than the outer diameter of the pipe 2, or it can be made with a inner diameter smaller than the outer diameter of the pipe 2, but with the ability of being radially extended (due for example to the afore said notch) when inserting the pipe 2 itself.

As known in the art, referring back to the particular embodiment of the ring nut 5 shown here, before the tightening of the nut 4 on the main body 3, the blocking ring nut 5 is contained within the fitting 1 with its notch open, in case due to the insertion within it of the pipe 2, that is shaped in such a way that it has maximum diameter, while when the nut 4 is tightened on the main body 3, such a ring nut 5 is urged, by the interference with the gasket 20, or with possible frames inside the main body 3 of the fitting 1, within the region with truncated cone inner surface of the nut 4, so as to narrow itself, by closing the notch and taking a shape with minimum diameter for internally blocking the pipe 2.

Substantially, when the nut 4 is completely tightened to the main body 3, the blocking ring nut 5 is moved from its starting position towards a conical region that, interfering with such a ring nut 5, determines its smooth crushing on the pipe 2. Advantageously, according to the present invention, the fitting 1 comprises means 7 for retaining in widened position the mouth section 20a of the annular sealing gasket 20 such that the inner diameter of such mouth section 20a is larger than the external diameter (De) of the pipe 2, so as to make the entry of the pipe 2 itself within the fitting 1 easy.

According to a preferred aspect of the present invention, these retaining means 7 comprise means able to stiffen the mouth portion 20a of the annular sealing gasket 20, so as to ensure that the external diameter (De) of the pipe 2 is always smaller than the inner diameter of the mouth section 20a of the gasket 20 and thus ensure the easy sliding of the pipe 2 within such a mouth section 20a, and thus within the sealing gasket 20.

This way, due to the presence of such retaining means 7, the annular sealing gasket 20, at least at its mouth section 20a, does not comes substantially into contact by friction, or interference, with the pipe 2 during the insertion of the latter within the main body 3, thus making the insertion within the fitting 1 easy, even when the latter is at least partially mounted.

That is, as long as the blocking ring nut 5 is not urged in its minimum diameter position within the nut 4, that is as long as the latter has not being closingly tightened on the main body 3, the pipe 2 can be inserted within the fitting 1, the latter being assembled, but with the nut 4 only partially screwed, without this causing a harmful interference of the inlet end of the pipe 2 on the sealing gasket 20.

In effect, when the pipe 2 enters within the fitting 1, through the inlet section of the nut 4, the relevant inlet end in the fitting 1 meets the blocking ring nut 5 first, in its arrangement with maximum diameter larger than the outer diameter of the pipe 2, or in an alternative arrangement thereof with diameter able to be widened due to the insertion of the pipe 2 itself, and then the mouth section 20a, suitably stiffened, or at least retained in a widened condition, by the gasket 20, which has a inner diameter larger than the outer diameter De of the pipe 2, so as to favor the sliding of the pipe 2 within the whole sealing gasket 20, without causing interferences between the latter and the pipe 2 itself, and instead allowing the perfect insertion of the latter within the gasket 20.

Next, once the pipe 2 is inserted within the fitting 1, the sealing gasket 20 and the blocking ring nut 5 itself are suitably compressed between the nut 4 and the inside of the main body 3, such as to be able to serve to respectively ensure the seal of the pipe 2 and retain the pipe 2 blocked within the fitting 1, once the fastening means 4 (nut) are tightened to the main body 3 of the fitting 1.

According to a further aspect of the present invention, the retaining means 7 can preferably comprise an annular stiff element having an inner diameter Di larger than the outer diameter De of the pipe 2, on which the annular sealing gasket 20 is externally put on, at its mouth section 20a. This way, the pipe 2, at least at the mouth portion 20a of the sealing gasket 20, never enters into contact with the gasket 20 itself and thus the latter is prevented from crushing on itself during the pipe 2 insertion within the fitting 1 and the tightening of the fastening means (nut) 4 to the main body 3.

Such annular stiff element 7, made of a material selected from plastic and metal, but specifically metal (brass for example), can be removably interference combined within the annular sealing gasket 20. Practically, the outer diameter of this annular stiff element 7, which is larger than the inner diameter of the mouth section 20a of the sealing gasket 20, interferes with the latter causing at least the widening of the mouth section 20a of the sealing gasket, made of deformable material. The elasticity of the sealing gasket 20, then, causes the annular element 7 to remain constrained to the gasket 20 itself.

According to a particular embodiment of the invention herein not shown, the annular stiff element 7 can be irremovably, thus firmly constrained, to the sealing gasket 20. For example, such annular element 7, once placed in interference with the sealing gasket 20, can be glued and/or welded to the annular sealing gasket 20 itself such that it can be no more unconstrained from the latter, or it can be substantially realized in a single piece with the sealing gasket 20, for example by molding atop the material forming the gasket 20 on the annular stiff element (preferably made of metal).

Figure 2A:
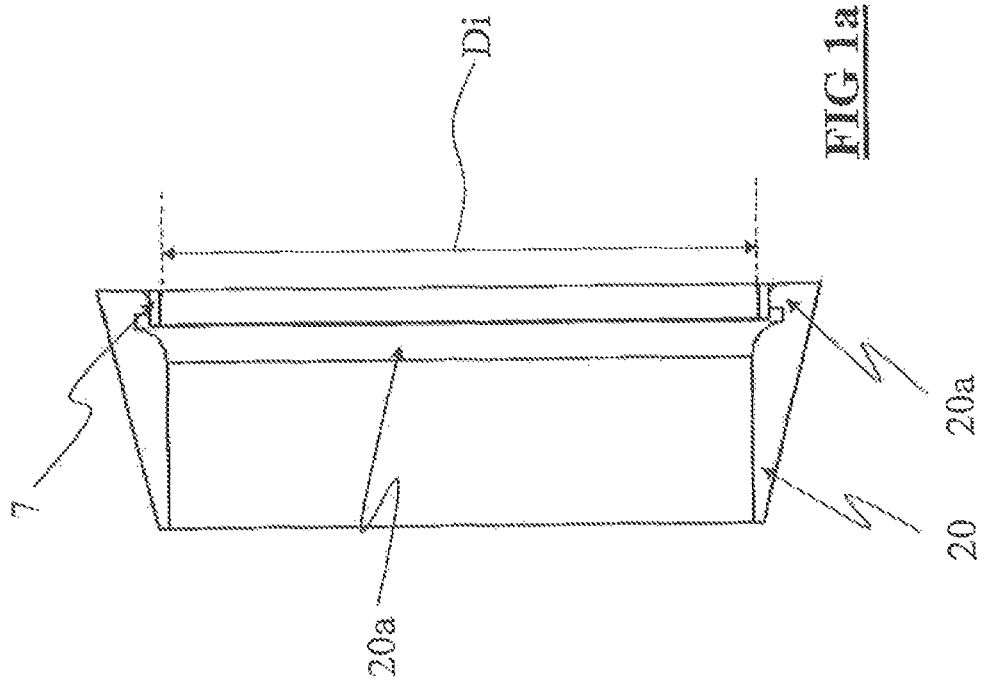
FIG. 2a is a sectional view of an annular sealing gasket and a corresponding annular stiff element according to a second embodiment of the invention.
Figure 2B:
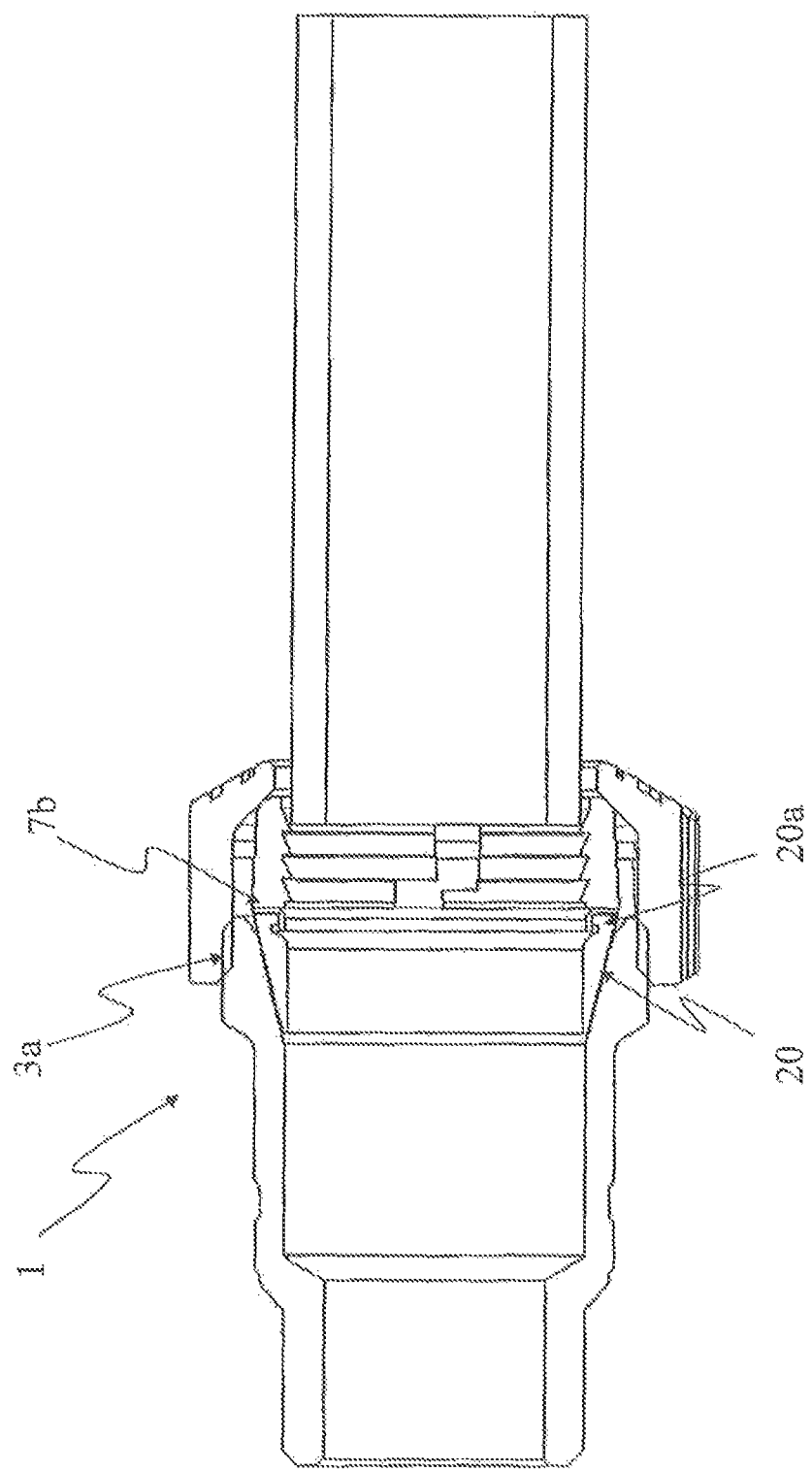

According to a second embodiment of the invention (FIGS. 2a and 2b), the annular element 7 comprises a radially jutting edge 7b with respect to its outer surface 7a, to substantially space the sealing gasket 20 from the blocking ring nut 5. Such annular stiff element 7 takes therefore a "L"-shaped profile.

This "L"-shaped profile, therefore, not only makes the insertion of the annular element 7 within the sealing ring easy, by widening it, but also allows to aid a homogeneous distribution of the thrust strength exerted by the blocking ring nut 5 on the sealing gasket 20, when the fastening means (nut) 4 are tightened to the main body 3.

In fact, during the tightening of the fastening means 4, the jutting edge 7b remains arranged between the annular sealing gasket 20 and the blocking ring nut 5, thereby ensuring that, for high tightening momenta, the sealing gasket 20 yet preserves its shape and functionality within the fitting 1.

Further, the presence of the jutting edge 7b has the important function of avoiding that the blocking ring nut 5 pinches, or damages, the gasket 20, during the tightening of the nut 4, thus causing a reduced efficiency of the sealing gasket 20 itself. Moreover, such jutting edge 7b also provides a not deformable stop abutment for the gasket 20, when the annular stiff element 7 is combined to the latter.

Figure 4:
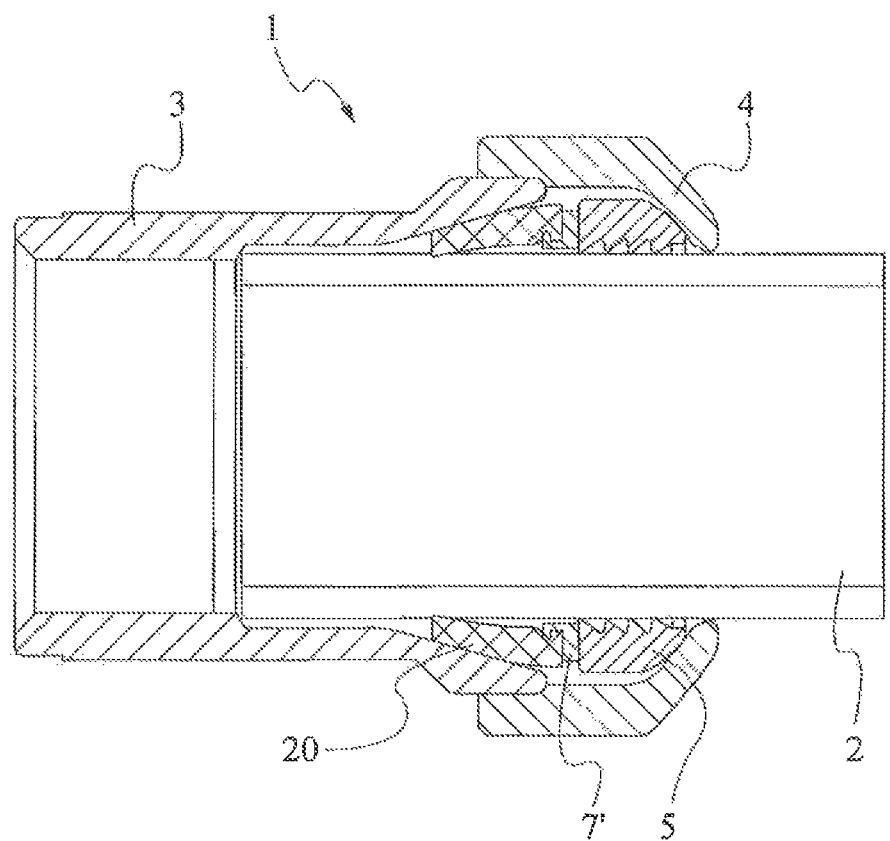
FIG. 4 is a side sectional view of a fitting according to a further embodiment of the invention.
Figure 6:
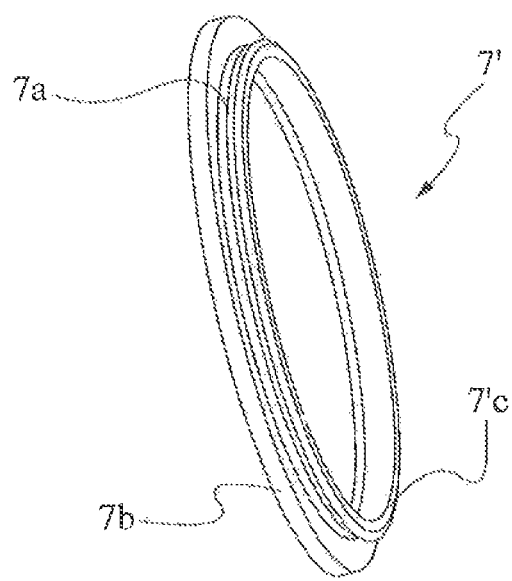
FIG. 6 is a perspective view of an annular stiff element, acting as means for retaining in widened position the mouth section of an annular sealing gasket of a fitting according to a particular embodiment of the present invention.

As shown in FIG. 4 and FIG. 6, illustrating a further embodiment of the present invention and wherein like reference numbers for like parts in the preceding figures have been used, alternatively, or in conjunction to the above "L" shape, the annular element 7' can also show a further radially jutting step 7'c, or other equivalent radially jutting coupling element, that can be, for example, arranged in an ending portion of the annular element 7' opposite with respect to that from which the edge 7b projects and which is intended to engage, by geometrical juxtaposition, with a relevant and complementary seat, or recess, internally obtained within the sealing gasket 20, or can simply elastically deform the inner wall of the sealing gasket 20, substantially catching hold of it.

Such radially jutting element 7'c (step) of the annular element 7' serves to anchor such annular element 7' to the sealing gasket 20, by—at least—simple elastic deformation of the latter, by making the assembling of the annular stiff element 7' with the gasket 20 highly simplified.

In case the annular element 7' results provided with both the jutting edge 7b, intended to be arranged over the gasket 20 end, and the jutting frame 7'c, intended to engage within the relevant inner seat of the gasket 20 itself, such annular element takes therefore a substantially "U"-shaped profile.

Finally, according to a further embodiment of the invention (see FIG. 3), the blocking ring nut 5 can be provided with an ending portion 60 able to be engaged with the fastening means 4, that is the nut 4, since, according to a particular aspect of this invention, the ending portion 60 on the ring nut 5 is concave, such that it can accommodate a corresponding ending portion 80 of the nut 4.

As the skilled in the art could have appreciated from the above disclosure, the combination of the ring nut 5, with an inner diameter larger than the outer diameter (De) of the pipe 2, or with an outer diameter able to be widened when the pipe 2 engages it, and mainly elastically deformable at least in radial direction, advantageously due to the notches or notch provided on it, and to the above mentioned means 7 or 7' for retaining in widened position at least the mouth section 20a of the annular sealing gasket 20, allow the pre-assembling of the fitting 1 in all of its parts, including the fastening means (nut) 4, yet untightened, and only subsequently inserting the pipe 2 within the pre-assembled fitting 1, without this insertion in the pipe 2 being hampered by undeserved deformations of the gasket 20 and/or by offsets of the ring nut 5.

It has to be observed that the particular shape and elastic deformability properties of the ring nut 5 and the presence of said means 7 or 7' for retaining in widened position at least the mouth section 20a of the annular sealing gasket 20, allow to easily withdraw the pipe 2 from the fitting 1, when the fastening means (nut) 4 are partially untightened.

Therefore, according to the invention, it is also provided a method for connecting a pipe 2 to a fitting 1 of the above disclosed type. Such a method comprises the steps of: a) positioning the annular sealing gasket 20 and the blocking ring nut 5, at least radially deformable and with an inner diameter larger than outer diameter of the pipe 2, between the main body 3 and the fastening means (the nut 4 for example); b) combining the fastening means 4 to the main body 3, without tightening them; c) inserting the pipe 2 within the fitting 1 (through the mouth section of the fastening means 4); and d) tightening the fastening means 4 to the main body 3.

Advantageously the afore said step a) of the method is preceded by the step of retaining in widened position, by means of suitable retaining means 7 or 7', the mouth section 20a of the annular sealing gasket 20 such that the inner diameter results larger than the outer diameter of the pipe 2.

By doing so, it has to be observed that the steps a) and b) of the above disclosed method can be realized by only the manufacturer of the herein claimed fitting 1, while the next steps c) and d), that is the insertion of the pipe 2 and complete tightening of the fastening means 4, are referred to the final user.

It has to be observed that, partially untightening the fastening means 4, with the fitting 1 still mounted, the pipe 2 can be easily withdrawn from the fitting 1 itself, without the need of totally disassembling the latter, due to the elastic deformability, at least in radial direction, of the ogive 5 and the stiffness of the end of the sealing gasket 20, given it by the retaining means 7 or 7'.

Such a repartition of the steps of the method for connecting a pipe 2 to a fitting 1 subject of this invention, shows to be particularly efficient, since, differently from the known art, it makes the mounting of the fitting 1 by the final user unnecessary, also making the insertion, but also withdrawal operations of the pipe 2 within the fitting 1 itself, easy.

As it is evident from the above provided disclosure of the fitting 1, such solution allows, therefore, to insert/disconnect the pipe 2 within the fitting 1 even when the nut 4 is combined or even only partially screwed, to the main body 3, since it does not deform the annular sealing gasket 20 during its introduction/withdrawal in the fitting 1, nor provides a deformation of the ogive 5 preventing the ogive elastic coming back to such an arrangement that allows the internally sliding of the pipe 2. The gasket 20 can thus remain substantially stiff due to the presence of the aforesaid retaining means 7 or 7', at least at the mouth section 20a of the sealing gasket 20 itself and the ogive 5 does not prevent the insertion/disconnection of the pipe 2.

The invention claimed is:

1. A fitting for a pipe, comprising a main body for internally accommodating said pipe, a nut or bush able to be tightened to said main body, said main body accommodating a deformable annular sealing gasket that is provided with a mouth section for said pipe, and a blocking ring nut for firmly and sealingly locking said pipe at least when said nut or bush is tightened to said main body, said blocking ring nut being elastically deformable at least in radial direction, said blocking ring nut having circular sealing ribs on an inner surface thereof, said fitting comprising an annular stiff element having an inner diameter (Di) larger than the outer diameter (De) of said pipe, the annular stiff element interfering with the internal surface of the mouth section of said annular sealing gasket causing the widening of the mouth section of the annular sealing gasket, the annular stiff element being interposed between and being in contact with the annular sealing gasket and the blocking ring nut, and the circular sealing ribs of the blocking ring nut configured to contact the pipe.

2. The fitting according to the claim 1, wherein said annular stiff element comprises a coupling element, radially jutting, for the engagement with part of the inner surface of said sealing gasket.

3. The fitting according to claim 1, wherein said annular stiff element can be removably combined to said gasket.

4. The fitting according to claim 1, wherein said annular stiff element is immovably fastened to said gasket.

5. The fitting according to claim 4, wherein said annular stiff element is welded and/or glued to said sealing gasket, or said sealing gasket is molded atop to said annular stiff element.

6. The fitting according to claim 1, wherein said main body has a tapered surface configured to contact an external surface of the annular sealing gasket.

7. The fitting according to claim 1, wherein said annular stiff element comprises a radially jutting edge with respect to its outer surface to space said sealing gasket and said blocking ring nut from each other, at least when said a nut or bush are tightened to said main body.

8. The fitting according to claim 1, wherein said blocking ring nut comprises an axial notch.

9. The fitting according to claim 1, wherein said sealing gasket is made of rubber or other synthetic or natural deformable material.

10. The fitting according to claim 1, wherein said annular stiff element is made of a material selected from plastic and/or metal.

11. The fitting according to claim 1, wherein said blocking ring nut is provided with an ending portion that could be engaged to said nut or bush.

12. The fitting according to claim 11, wherein said ending portion is concave to accommodate a tapered ending portion of said nut or bush.

13. The fitting according to claim 1, wherein said pipe is made of a material selected from plastic, metal or a plastic-metal composite.

14. The fitting according to claim 1, wherein said annular gasket has a truncated cone, or cylindrical or toroidal development.

15. A fitting for a pipe, the fitting comprising a main body for internally accommodating said pipe, a nut or bush able to be tightened to said main body, said main body accommodating a deformable annular sealing gasket that is provided with a mouth section for said pipe, and a blocking ring nut for firmly and sealingly locking said pipe at least when said nut or bush is tightened to said main body, said blocking ring nut being elastically deformable at least in radial direction, said blocking ring nut having circular sealing ribs on an inner surface thereof, the circular sealing ribs of the blocking ring nut configured to contact the pipe, said fitting comprising an annular stiff element having an inner diameter (Di) larger than the outer diameter (De) of said pipe, the annular stiff element interfering with the internal surface of the mouth section of said annular sealing gasket causing the widening of the mouth section of the annular sealing gasket, the annular stiff element being provided with a radially jutting coupling element for the engagement of said annular stiff element to the annular sealing gasket by means of elastic deformation of the annular sealing gasket.

* * * * *